May 30, 1961
K. GELPKE
2,986,077
METHOD AND DEVICE FOR JOINING ENVELOPES
AND SIMILAR ARTICLES TO FORM
A CONTINUOUS BAND THEREOF
Filed Jan. 24, 1958
5 Sheets-Sheet 4
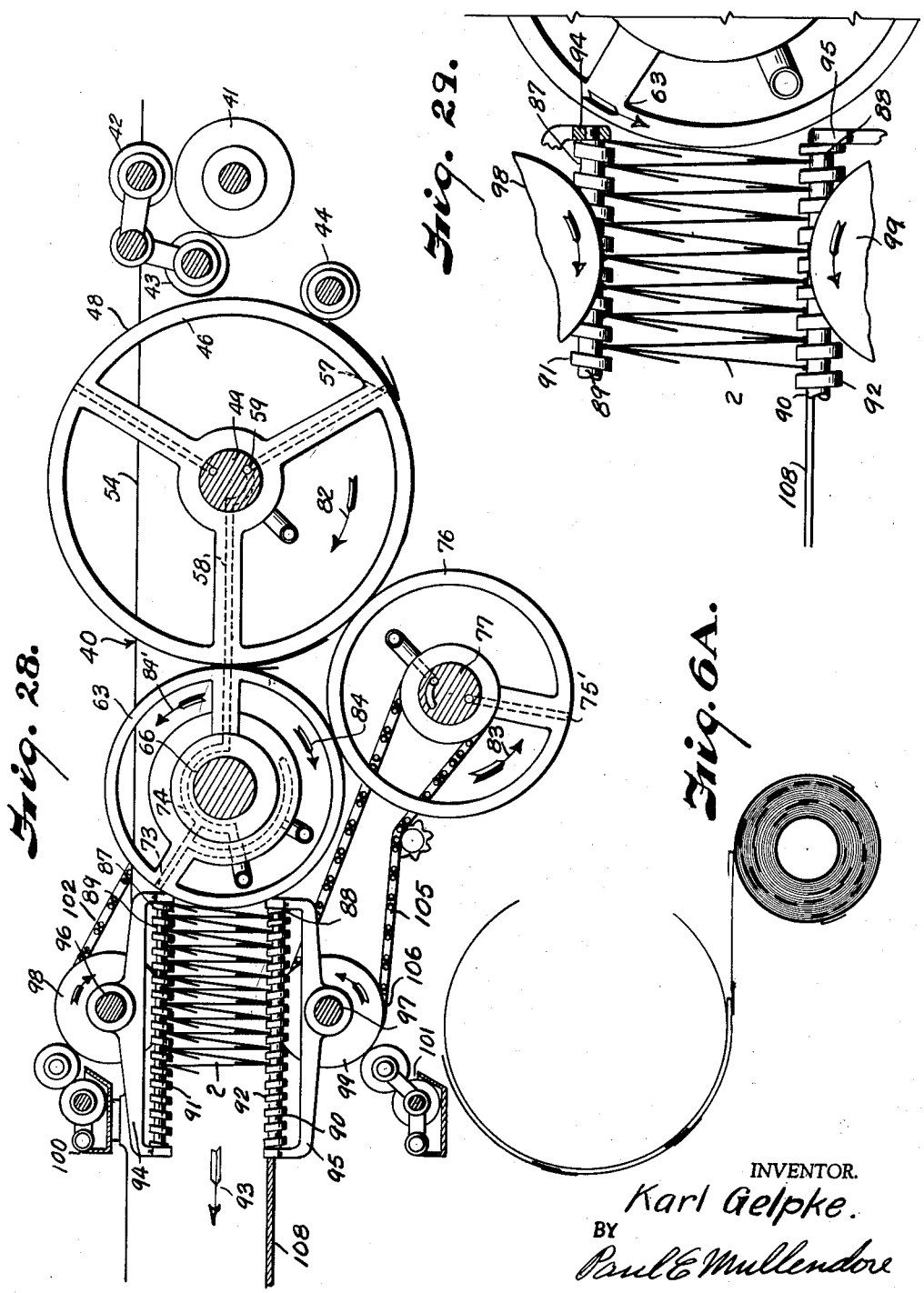
INVENTOR.
Karl Gelpke.
BY
Paul E. Mullendore
ATTORNEY May 30, 1961 K. GELPKE 2,986,077
METHOD AND DEVICE FOR JOINING ENVELOPES
AND SIMILAR ARTICLES TO FORM
A CONTINUOUS BAND THEREOF
Filed Jan. 24, 1958 5 Sheets-Sheet 5

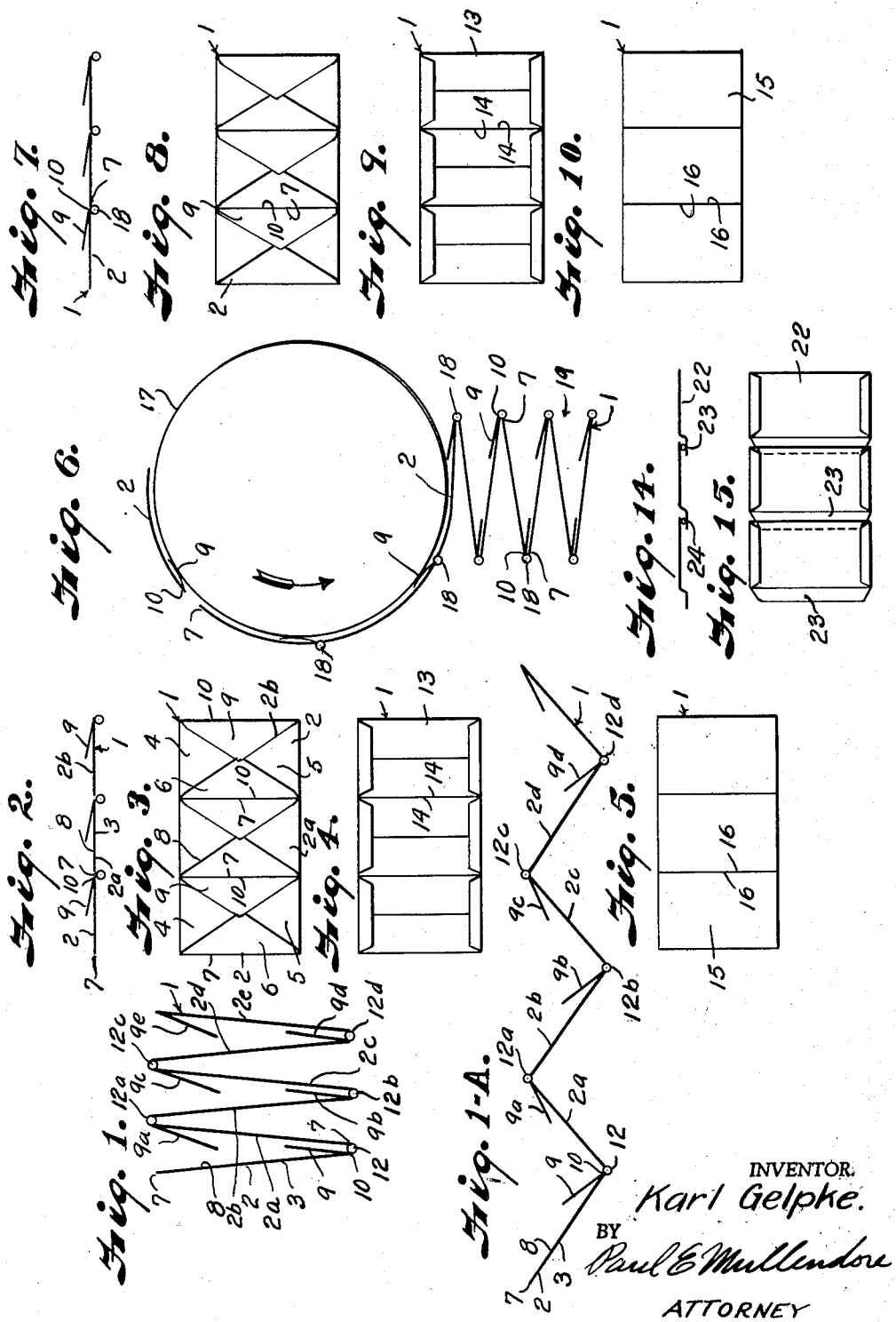
May 30, 1961
K. GELPKE
2,986,077
METHOD AND DEVICE FOR JOINING ENVELOPES
AND SIMILAR ARTICLES TO FORM
A CONTINUOUS BAND THEREOF
Filed Jan. 24, 1958
5 Sheets-Sheet 1
INVENTOR.
Karl Gelpke.
BY
Paul E Mullendore
ATTORNEY

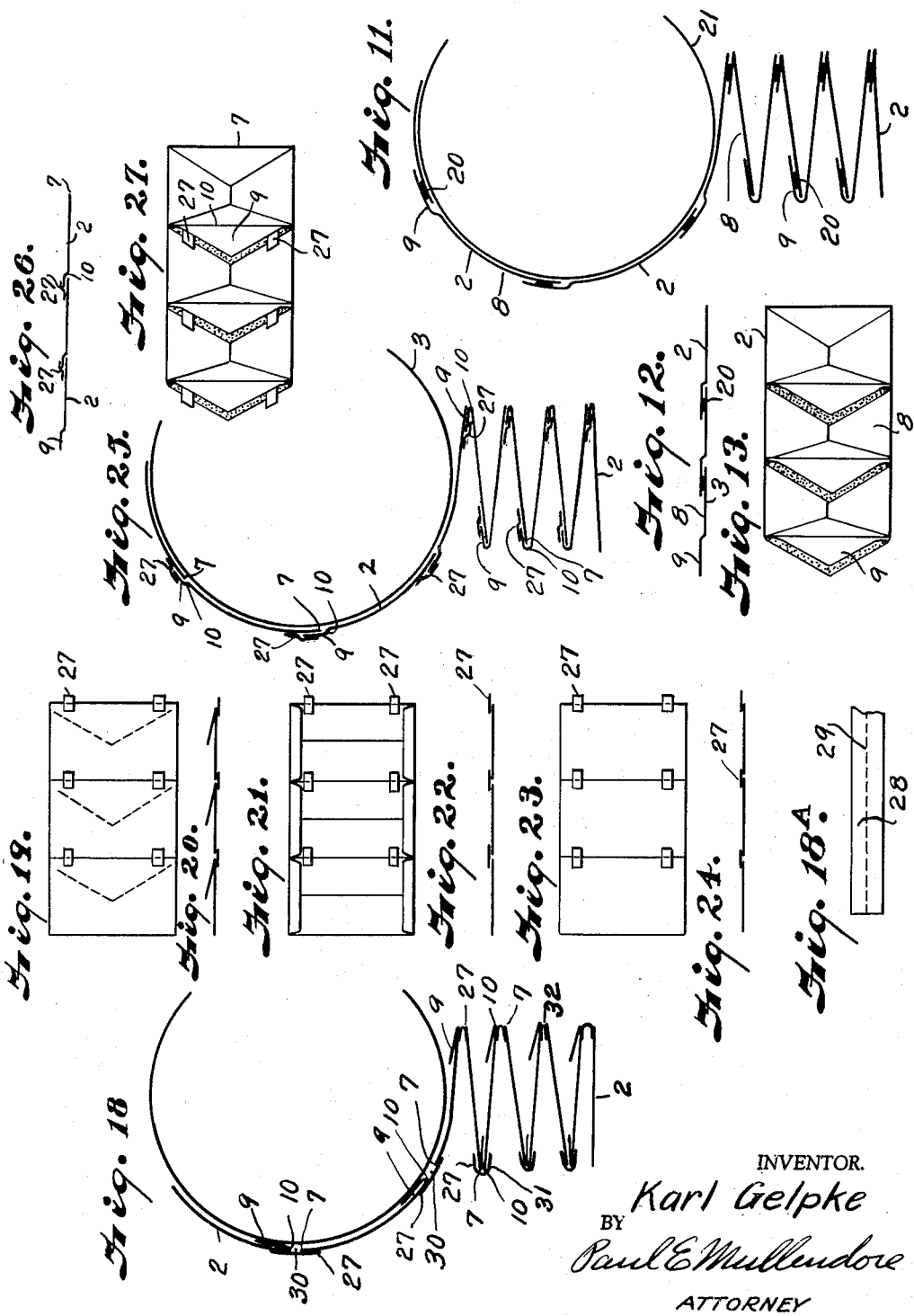

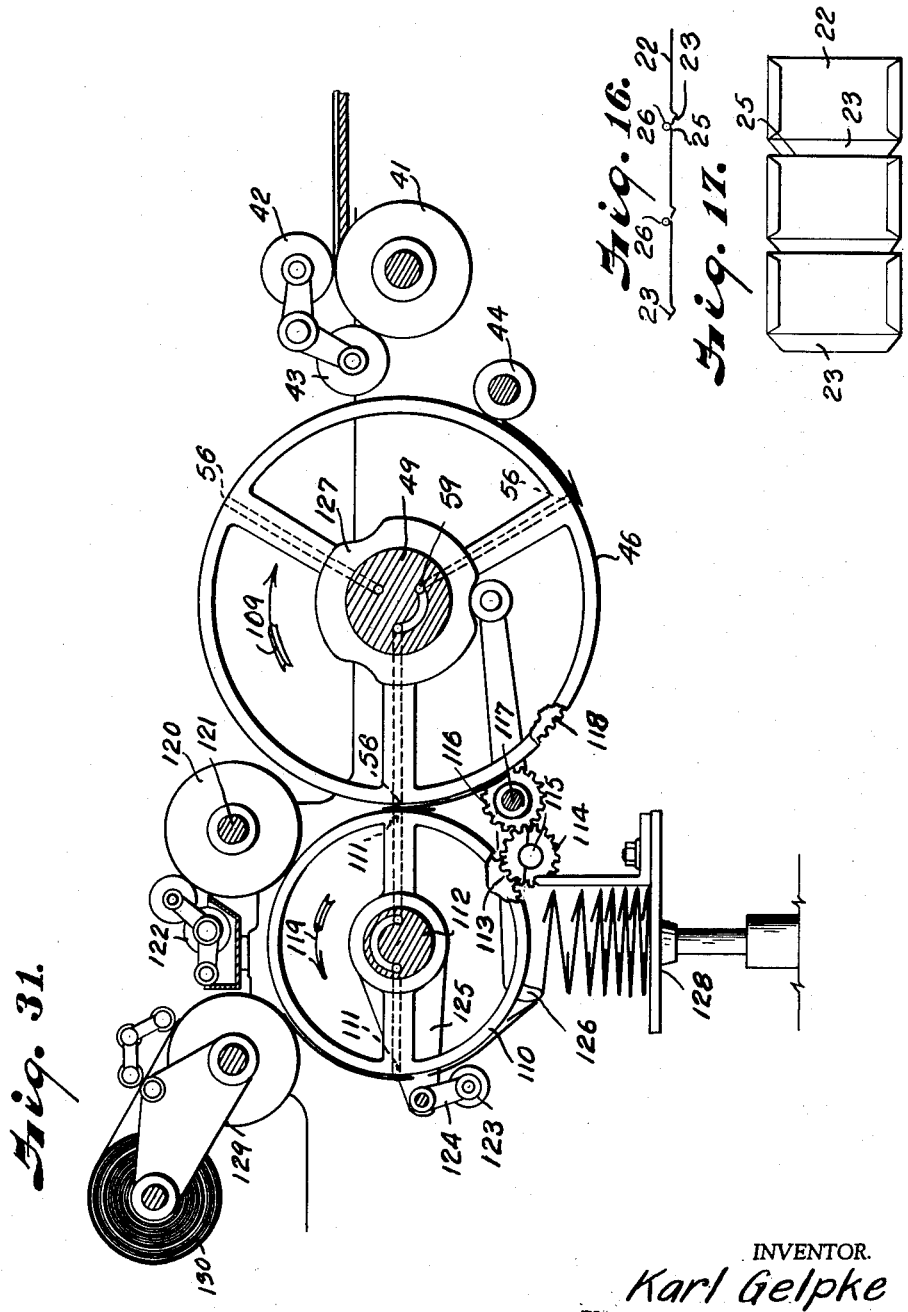

INVENTOR.
*Karl Gelpke.*
BY
*Paul E Mullendore*
ATTORNEY

United States Patent Office 2,986,077
Patented May 30, 1961

2,986,077
METHOD AND DEVICE FOR JOINING ENVELOPES AND SIMILAR ARTICLES TO FORM A CONTINUOUS BAND THEREOF
Karl Gelpke, Wollendorf, near Neuwied, Germany, assignor to Berkley Machine Company, Kansas City, Mo., a corporation of Missouri
Filed Jan. 24, 1958, Ser. No. 711,056
Claims priority, application Germany Feb. 8, 1957
7 Claims. (Cl. 93—1)

This invention relates to a method and device for joining envelopes and similar articles to form a continuous band thereof which may be rolled or retained in an accordion fashion for convenience and speed of handling in certain types of addressing machines and the like.

For example, there is a considerable market for envelopes and similar articles in continuous form, but previous methods require stacking of the articles and coating opposite sides of the stack with an adhesive of a type that remains flexible when dry. After the adhesive is dried, the adhesive must be slit open between opposite alternate edges of pairs of the articles, in order that the articles are connected in zigzag fashion. This method of connecting the articles has been slow, tedious, and is expensive.

Therefore, the principal object of the present invention is to provide a method and device by which such articles as envelopes are joined together in a more satisfactory, faster, and less expensive manner.

Other objects of the invention are to provide a method and device whereby only the alternating edges of articles are connected, thereby eliminating the slitting operation; to provide a mechanism for connecting such articles as envelopes which may be in a unit itself or as an attachment to an existing envelope making machine, and to provide for connecting such articles as envelopes in one continuous operation to form practical endless bands of the article that are easy to store and wherein the articles are easily separated.

A further object of the invention is to provide a mechanism having application to a conventional pile delivery machine, wherein the envelopes can be transformed in one operation from single pieces to alternately joined zigzag or roll formation, thereby transforming the conventional machine for greater general utility.

In accomplishing these and other objects of the invention, as hereinafter described, we have provided improved methods and a device for performing the methods as illustrated in tthe accompanying drawings, wherein:

Fig. 1 is a diagrammatic view of a band of envelopes connected in zigzag fashion in accordance with the present invention.

Fig. 1-A is a similar view, but with the zigzag chain of envelopes being more extended to better illustrate the connections between adjacent envelopes.

Fig. 2 is a side view of the envelopes shown in Figs. 1 and 1-A and in flattened condition.

Fig. 3 is a plan view of the band of envelopes in flattened condition.

Fig. 4 is a view similar to Fig. 3, but showing a different type of envelope.

Fig. 5 is a plan view of a flattened band composed of a series of cards or forms.

Fig. 6 is a diagrammatic view of one method of forming a zigzag band of envelopes utilizing a revolving disk or drum.

Figure 30:
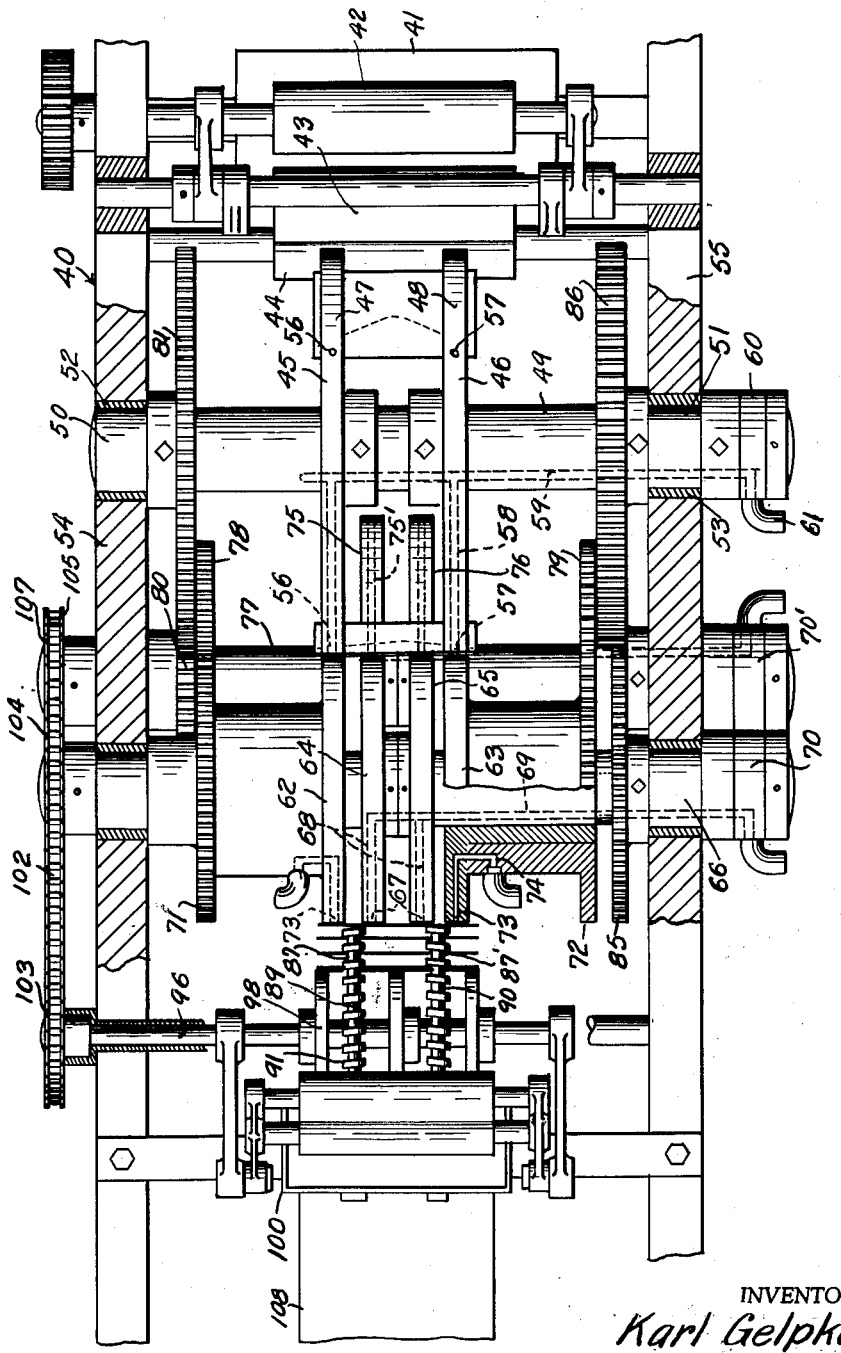

Fig. 6-A is a diagrammatic view, similar to Fig. 6, but showing the step of rolling up the band of envelopes.

Fig. 7 is a side view of a band of envelopes connected as shown in Fig. 6.

Fig. 8 is a plan view of the band shown in Fig. 7.

Fig. 9 is a plan view of a band composed of a different type of envelope.

Fig. 10 is a plan view of a band composed of cards or forms.

Fig. 11 shows a further modified method of connecting and stacking envelopes in accordance with the present invention, and by which the closing flaps of the envelopes are opened and gummed to bottom parts or flaps of the next adjacent envelopes.

Fig. 12 shows an edge view of a flattened band connected as shown in Fig. 11.

Fig. 13 is a plan view of the band as shown in Fig. 12.

Fig. 14 shows an edge view of a flattened band constructed as shown in Fig. 11, but illustrating a different type of envelope.

Fig. 15 is a plan view of the band shown in Fig. 14.

Fig. 16 shows a side view of a flattened band wherein the envelopes are connected in a different manner.

Fig. 17 is a plan view of the band shown in Fig. 16.

Fig. 18 illustrates a further modified method of connecting the envelopes in accordance with the present invention, by strips or pieces of adhesive tape.

Fig. 18-A illustrates a fragment of the strip that may be used in conjunction with the method shown in Fig. 18.

Fig. 19 is a plan view of a flattened strip or band formed by the method shown in Fig. 18.

Fig. 20 is an edge view of the band shown in Fig. 19.

Fig. 21 is a flattened plan view of a band wherein the envelopes are connected by the method illustrated in Fig. 18, but showing a different type of envelope.

Fig. 22 is an edge view of the band shown in Fig. 21.

Fig. 23 is a plan view of a flattened band constructed in accordance with the method shown in Fig. 18, wherein the band is composed or cards or forms.

Fig. 24 is an edge view of the band shown in Fig. 23.

Fig. 25 shows a diagrammatic view of a further modified form of the invention.

Fig. 26 is an edge view of a band in flattened condition as constructed by the method shown in Fig. 25.

Fig. 27 is a plan view of the band shown in Fig. 26.

Fig. 28 illustrates a side elevational view of a device for connecting and stacking envelopes in accordance with the method shown in Figs. 1 to 5, inclusive.

Fig. 29 is a fragmentary view on larger scale of the feeding and gumming device shown in Fig. 28.

Fig. 30 is a plan view of the device of Fig. 28, parts being shown in section to better illustrate the construction.

Fig. 31 is a modified form of the device.

Referring more in detail to the drawings:

Figs. 1, 1-A, 2 and 3 illustrate a continuous tape or ribbon 1 composed of envelopes 2 connected together in accordance with the present invention. Each envelope 2 comprises a front side 3 having end flaps 4 and 5 folded thereover, and a bottom flap 6 that connects with the bottom edge of the front side by a fold 7 and is secured to the side flaps to complete the back side 8 of the envelope. Each envelope also has a closure flap 9 connected with the edge of the front side opposite the fold 7 by a fold 10, so that the closure flap 9 overlaps the back side 8 in the manner of a standard envelope. For the sake of clearness, the edges of the envelopes are shown in single lines.

The envelopes are alternately turned to one side and the other, so that the closure flaps 9a, 9c and 9e of alternate envelopes 2a, 2c and 2e, or one group of envelopes, are positioned at the top, and the closure flaps 9, 9b and 9d of the intermediate envelopes 2, 2b and 2d, or another group, are placed at the bottom. Also, the envelopes are placed so that the back side of the envelope 2 faces the back side of the envelope 2a, the front side of the envelope 2a faces the front side of the envelope 2b, the back side of the envelope 2b faces the back side of the envelope 2c, the front side of the envelope 2c faces the front side of the envelope 2d, and the back side of the envelope 2d faces the back side of the envelope 2e. When thus arranged, every other envelope has the same relative position and the intermediate envelopes are reversely arranged. The folds 7 and 10 are also registered and brought into registry, after which the fold edges 10 and 7 of the envelopes 2 and 2a are connected by adhesive 12, the fold edges 10 and 7 of the envelopes 2a and 2b are connected by adhesive 12a, the fold edges 10 and 7 of the envelopes 2b and 2c are connected by adhesive 12b, and so on until the envelopes are all connected one to the other. After connection, the envelopes form the continuous tape or ribbon 1, having accordion folds, as best illustrated in Fig. 1–A, wherein the envelopes are drawn apart to show the zigzag arrangement connection of the envelopes.

When the envelopes are thus connected they stack readily and are easily retained in stacked relation for storage or use without becoming easily disarranged.

When the tape or ribbon 1 is stretched out, it will be noted that the envelopes all have the same arrangement in the ribbon or hand, that is, the front sides of all of the envelopes are on one side of the tape or ribbon, and the back sides are all at the opposite side thereof with the envelopes connected in consecutive order with the closure flap fold 10 of one envelope connected with the bottom fold 7 of the next envelope.

If desired, the envelopes, instead of being stacked in zigzag arrangement, may be spread out as shown in Figs. 2 and 3 and then rolled up into a roll.

In the same manner it is also possible to bond together open end envelopes 13, paper bags or pockets, as shown in Fig. 4, however, in this arrangement the side folds 14 of the envelopes are connected together, as will be more specifically hereinafter described.

The method of connecting and folding as above disclosed may also be used for connecting and storing cards, forms, loose leaves and like sheets 15, as shown in Fig. 5, in which case the sheets 15 are connected along their side edges 16.

The method shown in Figs. 6 to 10 involves a different manner of gathering the articles and applying the glue or adhesive when forming a continuous band, and the gluing step takes place prior to the zigzag arrangement of the articles. In this method the envelopes 2 are carried in consecutive order and are carried with the closure flaps 9 downwardly in contact with a cylindrical surface 17 with the edge fold 10 for the closure flap of a successive envelope moving into contact with the bottom edge fold 7 of a preceding envelope. The glue is applied as indicated at 18 to join the butting edges 7 and 10, after which the envelopes are zigzagged to form a continuous stack 19, as shown in Fig. 6, or they may be formed in a roll as they are carried off the cylindrical surface.

Figs. 7 and 8 show the stretched-out blanks resulting from the method of Fig. 6. This method is also adapted for connecting open end envelopes, wrappers 13 and the like having the folds 14 at the sides thereof. In this case the side folds 14 are butted and joined with glue.

The method of Fig. 6 is also adapted to connect cards 15 and the like, in which case the cards 15 are brought into edge to edge relation and the edges 16 joined by applying glue thereto as in the case of the envelopes.

In the method of Fig. 11, the envelopes 2 are carried with the back sides 8 facing outwardly with the closure flaps 9 open. Glue is applied to the lower marginal faces of the back sides 8 of the envelopes or to the faces of the closure flaps for interconnecting the closure flap of one envelope to the underlapping marginal face of the back side of the next envelope, as indicated at 20, as the envelopes 2 are being carried about a cylindrical surface 21. The envelopes 2 are zigzagged as they come off the cylindrical surface, with one closure flap 9 on every other envelope folding one way and the closure flaps 9 on the intermediate envelopes folding the opposite way. When the tape or band of envelopes is stretched out as shown in Figs. 12 and 13, the closure flaps 9 are all extending in the same direction, with all of the front sides 3 of the envelopes on one side of the band and the back sides 8 on the other.

Figs. 14 and 15 show the connection of another type of envelopes 22, wrapper or pockets, connected by the method of Fig. 11, with the closure flaps 23 turned back and secured in lap-joint formation with the adjacent article by glue, as indicated at 24 (Fig. 14).

The method shown in Figs. 16 and 17 follows the method of Fig. 11 and illustrates the type of envelopes shown in Figs. 14 and 15, but the open closure flaps 23 are merely brought into substantial abuttment with the bottom fold edge 25 of the preceding envelope 22 and connected with adhesive as indicated at 26.

In Figs. 18 to 27, inclusive, are shown methods of connecting articles to form a continuous band 1 by strips 27 of adhesive tape 28. The adhesive tape is shown in Fig. 18–A and has a median line of perforations 29 extending longitudinally thereof.

As shown in Fig. 18, the fold edges 7 and 10 of the envelopes are brought substantially together on a revolving cylindrical surface, with the face sides 3 outermost and strips 27 are applied across the adjoining folds 7 and 10, with the perforations positioned directly over the spaces 30 therebetween. The envelopes are then zigzagged first to one side and then the other to bring the envelopes in the same relation as described in the methods shown in Figs. 1 and 6. During this operation, the alternate strips 27 bend one way around the folded edges 7 and 10, as indicated at 31, and the intermediate tapes 27 fold on themselves as indicated at 32. The spaces 30 give room for the tape to extend around the folds 7 and 10, so that when folded the envelopes lie flat and in face to face contact. When the envelopes are used they are easily torn apart apart along the lines of perforations 29.

Instead of stacking, the continuous band may be rolled upon a spool or reel.

When stretched out, the tape of interconnected envelopes appears as shown in Figs. 19 and 20.

Figs. 21 and 22 show open end envelopes 13 with their side edges 14 substantially in abuttment and connected crosswise thereof by strips 27 in accordance with the method of Fig. 18.

Figs. 23 and 24 show cards or the like 15 connected in edge to edge relation by strips 27.

In the method disclosed in Figs. 25, 26 and 27, the envelopes 2 are carried about a cylindrical surface with the face sides 3 contacting the surface and with the closure flap 9 of one envelope extended in lapping relation with the bottom edge portion of a succeeding envelope. Strips 27 of adhesive tape are then applied to stick to the closure flap of one envelope and to the back side of the following envelope to connect the envelopes together in a continuous band. As the envelopes come off the cylinder they are zigzagged as in the methods shown in Figs. 6, 11 and 18. The band made in accordance with the method disclosed in Fig. 25 appears as shown in Figs. 26 and 27 when the band is stretched out.

The aforedescribed methods of carrying out the invention are all well adapted for connecting envelopes and similar articles so that they may be stacked in zigzag fashion with an edge of one envelope temporarily secured to the opposite edge of an adjacent envelope and so that the envelopes are alternately arranged in the stack, but when stretched out the envelopes fall in continuous order with the closure flaps all extending in the same direction.

Therefore, the envelopes may be fed in a continuous direction to an addressing machine or the like.

The methods may best be carried out by mechanical means to provide for high quantity production and low cost, as now to be described.

The mechanical means 40 for accomplishing the methods shown in Figs. 1 to 10, inclusive, may be a self-contained unit through which the envelopes 2 are passed for assembly into a continuous band 1, or it may constitute an attachment to a known type of envelope making machine, of which only the delivery rollers 41, 42, 43 and 44 are shown in the present drawings, the delivery rollers advancing the envelopes one at a time from the envelope machine.

The machine 40 includes laterally spaced apart disks or wheels 45 and 46, the peripheries of which have substantially cylindrical surfaces 47 and 48. The disks 45 and 46 are mounted on a shaft 49 having its ends 50 and 51 journaled in bearings 52 and 53 that are provided in the side frames 54 and 55. The peripheries of the disks or wheels have grippers or other convenient means for successively engaging the envelopes, such as suction ports 56 and 57. Suction is drawn through the ports 56 and 57 by way of radial channels 58 that connect with channels 59 in the shaft 49. Suction through the channels is made and broken through a valve or distributor mechanism 60 that is mounted on the outer end of the shaft 49 and which connects through a duct 61 with a vacuum source, not shown.

Carried forwardly of the disks 45 and 46 is an outer pair of disks 62—63 and an inner pair of disks 64—65, all adapted to rotate on a common axis of a transverse shaft 66. The shaft 66 has its ends journaled in the side frames 54 and 55. The disks 64 and 65 are fixed on the shaft 66 and have suction ports 67 in the peripheral faces thereof that connect with radial ports 68 which are in turn connected with channels 69 in the shaft 66. The suction through the channels 69 is controlled by a distributor 70 similar to the distributor 60 previously described. The disks 62 and 63, together with driving gears 71 and 72 therefor, rotate loosely on the shaft 66. The disks 62 and 63 also have suction ports 73 in the periphery thereof that suitably connect with vacuum channels 74 controlled by a distributor means (not shown).

Located below and in registry with the inner pair of disks 64 and 65 are a pair of disks 75 and 76. The disks 75 and 76 are fixed to a transverse shaft 77, also journaled in the side frames 54 and 55. The peripheral faces of the disks 45 and 46 are arranged to effect alternate transfer of the envelopes to the pairs of disks 75—76 and 64—65, and the pair of disks 75—76 transfers the envelopes to the pair of disks 62—63, as later to be described. The disks 75 and 76 have suction ports 75' similar to the other disks, and the suction is controlled in like manner by a distributor 70' at one end of the shaft 77.

The gears 71 and 72 mesh with gears 78 and 79 on the shaft 77. Fixed to the shaft 77 is a gear 80 that meshes with a gear 81 on the shaft 49. The gear 81 rotates in a clockwise direction, as indicated by the arrow 82, Fig. 28, and, therefore, the shaft 77 rotates reversely to drive the disks 76 and 75 in a counterclockwise direction, as indicated by the arrow 83. Since the gears 78 and 79 are fixed to the shaft 77 and mesh with the gears 71 and 72, the disks 62 and 63 rotate in a clockwise direction, as indicated by the arrow 84. The disks 64 and 65 are to rotate in a counterclockwise direction, as indicated by the arrow 84', and, therefore, the shaft 66 is driven by a gear 85 that is fixed thereto and which meshes with a gear 86 on the shaft 49.

It is thus obvious that the outer disks 62 and 63 will carry the envelopes transferred thereto upwardly on the lefthand side to a position on the lefthand side of the disks (Fig. 28), and the inner pair of disks 64 and 65 will carry the envelopes transferred thereto downwardly over the lefthand side of the disks (Fig. 28) to respectively engage upper and lower stops 87 and 88. In the illustrated instance, the stops 87 and 88 are in pairs, as indicated at 87—87', Fig. 30. The stops comprise upper screw shafts, having the shaft portions 89 and 90 thereof spaced apart a distance substantially conforming to the height of the envelopes and whereby the spirals 91 and 92 engage the upper and lower side edges of the envelopes to move the envelopes forwardly in the direction of the arrow 93. The shafts 89 and 90 are suitably journaled in frames 94 and 95 (Fig. 28) that are adjustable to and from each other to accommodate the size of the envelopes that are being manufactured in the envelope making machine. The shafts are also suitably rotated to effect movement of the envelopes in the direction of the arrow 93.

Carried by the upper and lower frames 94 and 95 are transverse shafts 96 and 97 that carry thereon a plurality of adhesive applicator disks 98 and 99, there being three applicators 98 and three of the applicators 99 shown in the drawings, whereby three adhesive spots 12 are applied to the upper and lower edges of the envelopes to effect interconnection thereof, as previously described. The adhesive is applied to the applicators from adhesive pots 100 and 101 of usual design. The upper shaft 96 is driven in a counterclockwise direction from the shaft 66 by a chain 102 that is operable over sprockets 103 and 104 on the respective shafts 96 and 66. The shaft 97 is operated in a counterclockwise direction from the shaft 77 through a chain 105 that operates over sprockets 106 and 107 on the respective shafts 97 and 77. The pairs of spiral shafts 89 and 90 are of sufficient length so that the envelopes are retained therein a sufficient time for the adhesive 12 to dry. After the adhesive is dried, the envelopes are removed from the discharge end of the spiral shafts and are carried away by a conveyor 108. It is obvious that the mechanism as described may be operated by connecting any one of the shafts to an operating part of the envelope making machine.

The machine shown in Fig. 31 is for making the envelopes in accordance with the methods in which the envelopes are connected by lapping parts thereof or by using the adhesive strips 27. The mechanism of Fig. 31 may also be an attachment to an envelope making machine, of which the delivery rollers 41, 42, 43 and 44 are shown. This mechanism also includes the disks 45—46 which are mounted on the transverse shaft 49 and rotate in a clockwise direction, as indicated by the arrow 109. However, from here on the structure is different, since only one pair of stacking disks 110 are necessary to carry the envelopes to stacking position. The disks 110 have suction ports 111 controlled by a suction distributor of the type previously described. The disks 110 are carried on a transverse shaft 112, driven by gears 113 meshing with gears 114 on stub shaft 115. The gears 114 mesh with gears 116 on a transverse shaft 117 which mesh with gears 118 on the shaft 49, the gears 115 and 116 being necessary to cause the disks 110 to rotate in a counterclockwise direction and at different surface speeds, as indicated by the arrow 119.

This mechanism also includes adhesive applicator disks 120 which are carried on a transverse shaft 121 in a position to make contact with portions of the envelopes as they are carried around the periphery of the disks 110. The adhesive applicator disks are supplied with adhesive from an adhesive pot 122 of conventional construction.

Cooperating with the periphery of the disks 110 on the side thereof opposite the disks 45 and 46 are rollers 123 which are mounted on arms 124 pivoted to levers 125 on the shaft 112. The rollers 123 are in contact with the faces of the disks 110 and cooperate therewith in effecting lap of portions of the envelopes when the envelopes are connected with adhesive.

The mechanism also includes a presser arm 126 which is pivotally mounted on the shaft 117 and operated by a cam 127 on the shaft 49 and which cooperates with the suction ports to cause the zigzag lapping of the envelopes on a stack support 128.

If strips are used to connect the envelopes, the mechanism also includes a strip feeding device 129 for application of strips of adhesive tape to the envelopes. The tape is supplied from a roll 130 and is preferably of the self-sticking type and may be either plain or perforated, as desired.

The operation of the device shown in Figs. 28 to 30, inclusive, is as follows:

The envelopes are delivered by the rollers 41, 42 and 43 and between the roller 44 and suction disks 45 and 46, with the flaps in folded position and with the closure flap sides of the envelopes in the direction of travel. The first envelope is engaged by the vacuum ports 57 to seize the envelope to the faces of the disks. The disks 64—65 and 75—76 are timed so that the foremost envelope is transferred to the disks 75 and 76. This is effected by release of suction through ports 56 and application of suction through ports 75'. The envelope is then transferred to the disks 62 and 63 by establishing suction through the ports 73 of the disks 62 and 63 and release of the suction in the ports 75'. The envelope is then carried by the disks 62 and 63 upwardly into engagement with the stop 87 that is provided by the pairs of rotating spiral shafts 89 and 90. At this point the suction is released through ports 73, so that the envelope is deposited between the shafts 89 and 90. The following envelope advanced by the disks 45 and 46 is transferred directly to the disks 64 and 65 which are rotated in the direction if the arrow 84' to carry the envelope downwardly of the lefthand side and deposit it against the stop 88. This transport of the second envelope takes place so that it is deposited between the same spirals of the lower shafts 90 as received the lower edge of the first deposited envelope. The envelopes delivered from the envelope machine continue to be alternately deposited as just described. Thus the envelopes are placed between the pairs of shafts in staggered relation, with the fold 7 of one envelope extending along the fold 10 of the next envelope, and the fold 10 at the bottom side engaging a fold 7 of the adjacent envelope. The envelopes are retained by the spirals with the edges 7 and 10 in contact so that as they pass under the adhesive applicating rollers 98 and 99, spots of adhesive are applied thereto. By the time the envelopes have reached the ends of the spiral shafts, the adhesive is dry and the envelopes are connected in zigzag form, as previously described in connection with the method shown in Figs. 1 to 10, inclusive.

Folded wrappers, sheets and cards may be passed through the machine in the same manner as the envelopes just described, so as to effect connection thereof in accordance with the methods previously described.

In the form of the machine illustrated in Fig. 31, the envelopes follow in successive order and are deposited on the periphery of the disks 45 and 46 as previously described, for transfer in like order into position where they are seized by the suction through the ports 111 of the disks 110, at which time the suction is shut off through the ports 56. The envelopes continue their advance under the adhesive applicator 120, which applies gum thereto as the envelopes are carried in consecutive order thereunder. As the envelopes reach the roller 123, they become sufficiently close together to be connected by the adhesive, and upon release from the disks 110, the presser 126 comes into position to effect zigzag stacking of the envelopes.

If the lower portion of one envelope is to be connected with the flap of an adjacent envelope as shown in the method disclosed in Figs. 11 to 15, inclusive, the envelopes are delivered from the envelope machine with the flaps open and extending forwardly of the direction of travel and are partially lapped after the edhesive has been applied. Otherwise the operation is the same.

If the envelopes are to be connected with strips 27, the adhesive applicating disks 120 are removed or lifted out of position, and the strip-applying mechanism 129 brought into position, so that sections of adhesive strip are applied to the envelopes as they are carried under the strip-applying mechanism.

From the foregoing, it is obvious that we have provided methods whereby articles such as envelopes and the like may be fastened together to form a continuous band and that result in a faster operation with less expense than the previous method of stacking the articles, coating opposite sides of the stack with adhesive, and then cutting through the adhesive between alternate articles on the respective sides of the stack.

What we claim and desire to secure by Letters Patent is:

1. An apparatus for connecting envelopes in consecutive order and in alternating relation, including means for moving the envelopes in consecutive order, a support for carrying and advancing the envelopes with edges thereof in registry, separate transfer means for alternately receiving the envelopes from said moving means, means for operating the transfer means in opposite directions for depositing the envelopes in alternating reverse relation in the support, said support having means for engaging and holding the edges of a succeeding envelope with a preceding envelope at one side and the edges of said preceding and succeeding envelopes, respectively, in contact with the edges of other preceding and succeeding envelopes, and means at opposite sides of the support for applying adhesive to said contacting edges of the envelopes.

2. An apparatus for connecting envelopes in consecutive order and in alternating relation, including suction disks for moving the envelopes in consecutive order, a support including upper and lower pairs of spiral shafts for carrying and advancing the envelopes with edges thereof in registry, separate transfer disks for alternately receiving the envelopes from said suction disks, means for operating the transfer disks in opposite directions for reversing and depositing the envelopes in alternating order between the pairs of spiral shafts with the spirals engaging and holding the edges of a succeeding envelope with a preceding envelope at one side and the edges of said preceding and succeeding envelopes, respectively, in contact with the edges of other preceding and succeeding envelopes, and means at opposite sides of the support for applying adhesive to said contacting edges of the envelopes.

3. A method of interconnecting envelopes each having rectangular front and back face sides connected along three edges by folds to form a pocket therebetween having an insert opening along the other edges and having a closure flap connected by a fold with the front face side and overlying the back face side to close the insert opening, said method including delivering the envelopes consecutively in a fixed path from an envelope machine with the fold of the closure flap of one envelope substantially in coextensive contact with the opposite fold of the next adjacent envelope and with all of the envelopes arranged in the same corresponding relation with the closure flaps on the same side of the path, bringing the envelopes into face to face relation in the order of the front face side of one envelope facing the front face side of the following envelope and the rear face side of the next following envelope facing the rear face side of the said following envelope while maintaining the contacting folds of the envelopes in contiguous relation, gathering the contiguous folds of any two adjacent envelopes together while spreading the opposite folds of said any two adjacent envelopes apart, applying adhesive to the gathered together folds, drying the adhesive while maintaining the spread apart relation of the opposite folds, bringing the envelopes into face to face contact to form a stack of envelopes connected in a continuous chain of envelopes when the envelopes are withdrawn from the stack with the front face sides of all the envelopes on one side of the chain and the back face sides of all the envelopes on the opposite side with the closure flaps separately movable from folded position for access to the insert openings of the respective envelopes while the envelopes are connected in said chain.

4. An apparatus for interconnecting envelopes each having rectangular front and back face sides connected along three edges by folds to form a pocket therebetween having an insert opening along the other edges and having a closure flap connected by a fold with the front face side and overlying the back face side to close the insert opening, said apparatus including means for delivering the envelopes in consecutive order through a fixed path from an envelope machine with the fold of the closure flap of one envelope closely positioned to the opposite fold of the next adjacent envelope and with the envelopes arranged in the same corresponding relation with the closure flaps on the same side of the path, a conveyor for carrying the envelopes on edge and in face to face relation, means for transferring every other envelope onto the conveyor with the front face side thereof in a forward direction and the fold of the closure flap upwardly, means for reversing the intermediate envelopes with the back face sides facing forwardly with the fold of the closure flaps downwardly to maintain the original relation of the folds of the adjacent envelopes, means on the conveyor for gathering the related folds of two adjacent envelopes together while spreading the opposite folds of said two adjacent envelopes apart, and means at upper and lower sides of the conveyor for applying adhesive to the gathered together folds.

5. A method of interconnecting envelopes to form a continuous band of the envelopes of a type having rectangular front and back face sides connected along at least the bottom edges by a bottom fold to form a pocket therebetween and having a closure flap connected by a fold with the opposite edge of the front face side and overlying the corresponding opposite edge of the back face side to close an insert opening to said pocket, said method including gathering the envelopes with the face sides in alternately facing relation to each other with the closure flaps of adjacent envelopes being positioned between the back face sides of the gathered envelopes, bringing the fold of the closure flap of one envelope in coextensive contact with the bottom fold of the adjacent envelope alternately on opposite sides of the gathered envelopes, interconnecting the contacting folds while advancing the envelopes in said gathered relation, and bringing the envelopes with the facing sides in face to face contact to form a stack of the interconnected envelopes.

6. A method of interconnecting envelopes into a continuous band of the envelopes of a type having rectangular front and back face sides connected along at least the bottom edges by a bottom fold to form a pocket therebetween and having a closure flap connected by a fold with the opposite edge of the front face side and overlying the corresponding opposite edge of the back face side to close an insert opening to said pocket, said method including gathering the envelopes with the face sides in alternately facing relation to each other with the closure flaps of adjacent envelopes being positioned between the back face sides of the gathered envelopes, bringing the fold of the closure flap of one envelope in coextensive contact with the bottom fold of the adjacent envelope alternately on opposite sides of the gathered envelopes, maintaining contact of said folds while keeping the face sides of the envelopes out of face to face contact, applying an adhesive to said contacting folds, continuing advance of the envelopes in said relation during set of the adhesive, and bringing the envelopes in face to face contact to form a stack of the interconnected envelopes.

7. An apparatus for interconnecting envelopes to provide a continuous band of envelopes of a type having rectangular front and back face sides connected along at least the bottom edges by a bottom fold to form a pocket therebetween and having a closure flap connected by a fold with the opposite edge of the front face side and overlying the corresponding opposite edge of the back face side to close an insert opening to said pocket, said apparatus including means for conveying the envelopes in consecutive order, a rotor having means for gripping the envelopes and carrying the envelopes in consecutive order about the periphery thereof, spaced apart parallel spiral conveyors in advance of the rotor, oppositely rotating disk means between the rotor and the endmost convolutions of the spiral conveyors, one of said disk means having means for picking off alternate envelopes from the rotor and carrying said alternate envelopes for engagement by the endmost convolutions of said spiral conveyors, an intermediate transfer disk means between the rotor and the other disk means and having gripping means for picking off the intermediate envelopes from said rotor and to cooperate with said other disk means for depositing said intermediate envelopes into contact with said convolutions in following relation with the alternate envelopes for advancement by said spiral conveyors with the fold of a flap of one envelope in coextensive contact with the bottom fold of an adjacent envelope, means between said spiral conveyors for applying adhesive to said contacting folds, means for actuating the spiral conveyors to advance the envelopes while the convolutions thereof are retaining the contacting folds together during set of the adhesive, and means at the delivery ends of the spiral conveyors for receiving the interconnected envelopes in face to face contact.

References Cited in the file of this patent

UNITED STATES PATENTS

| | | |
|---|---|---|
| 1,893,086 | Keller | Jan. 3, 1933 |
| 2,610,868 | Flament | Sept. 16, 1952 |
| 2,660,098 | Vogt | Nov. 24, 1953 |
| 2,671,382 | Vogt | Mar. 9, 1954 |
| 2,675,747 | Greiner et al. | Apr. 20, 1954 |
| 2,691,922 | Pearce | Oct. 19, 1954 |

FOREIGN PATENTS

| | | |
|---|---|---|
| 1,045,476 | France | Nov. 26, 1953 |